United States Patent [19]

Ringer

[11] Patent Number: 4,773,487

[45] Date of Patent: Sep. 27, 1988

[54] SPEED LIMITER FOR AN AIR POWERED TOOL

[75] Inventor: Cecil D. Ringer, White Rock, S.C.

[73] Assignee: Allen-Bradley Company, Inc., Milwaukee, Wis.

[21] Appl. No.: 908,543

[22] Filed: Sep. 18, 1986

[51] Int. Cl.[4] .............................................. B23B 45/04

[52] U.S. Cl. ...................................... 173/18; 173/170; 415/157; 415/503

[58] Field of Search ......................... 173/18, 169, 170; 415/157, 503; 251/121

[56] References Cited

U.S. PATENT DOCUMENTS 3,924,961 12/1975 Hess et al. .......................... 173/169

3,948,479 4/1976 Bedo et al. .......................... 251/121

*Primary Examiner*—E. R. Kazenske
*Assistant Examiner*—James L. Wolfe
*Attorney, Agent, or Firm*—Quarles & Brady

[57] ABSTRACT

A speed limiter for setting the speed of an air tool has a flow passage body which screws into the air inlet of the tool. The body defines an axial air flow path therethrough with an annular land adjacent to internal threads. An adjusting insert is threaded to the internal threads and has a pair of opposed axially extending grooves formed in its periphery which extend further radially inward than the land. The size of the air flow passage and therefore the speed of the tool is varied by adjusting the insert toward or away from the land.

8 Claims, 1 Drawing Sheet

SPEED LIMITER FOR AN AIR POWERED TOOL

BACKGROUND OF THE INVENTION

This invention relates to air powered tools and, in particular, to a speed limiter for such tools.

Air powered tools typically have an inlet opening with internal threads to receive an air supply line, an air-driven motor, and a shaft which is turned by the motor. The speed of the motor is dependent upon the air pressure and the characteristics of the motor such as friction, exhaust back pressure and the fit of the components of the motor to one another. Because these tools are usually rated for a certain speed at a given pressure, it is desirable to provide some means for accurately setting the speed of the tool in the manufacturing process.

SUMMARY OF THE INVENTION

The present invention provides a simple speed limiter which can screw into the air inlet of existing tools and be set to a given speed in the factory. The speed limiter comprises flow passage means defining an axial air flow path therethrough. The flow passage means has internal threads in the air flow path. There are means defining an annular land axially adjacent to the internal threads. The land extends radially inward of the threads. Adjusting means are threadably engaged with the internal threads to be rotatable toward and away from the land, the adjusting means including rotary engagement means and at least one slot extending through the adjusting means in the axial direction, with the slot being adjacent to the radially outer periphery of the adjusting means. The cross-sectional area of the air flow path through the flow passage means is varied by rotating the adjusting means toward and away from the land to limit the speed of the tool.

One feature of the speed limiter is that it may have two axially-directed slots, permitting a higher volume of air flow than a single slot without sacrificing sensitivity. Another feature of the slots is that, if they extend further radially inward than the land, the air flow cannot be completely shut off by the speed limiter.

Another feature of the speed limiter is that the adjusting means can be bonded to the flow passage means to deter tampering with the adjustment.

Another feature of the speed limiter is that it is preferably upstream of the air-driven motor, providing more accurate control than if it were located downstream of the motor. In addition, the adjusting means is preferably located upstream of the land so that the force of air on the adjusting means tends to close off the air flow path.

DESCRIPTION OF THE PREFERRED EMBODIMENT

Figures 1, 2, 3:
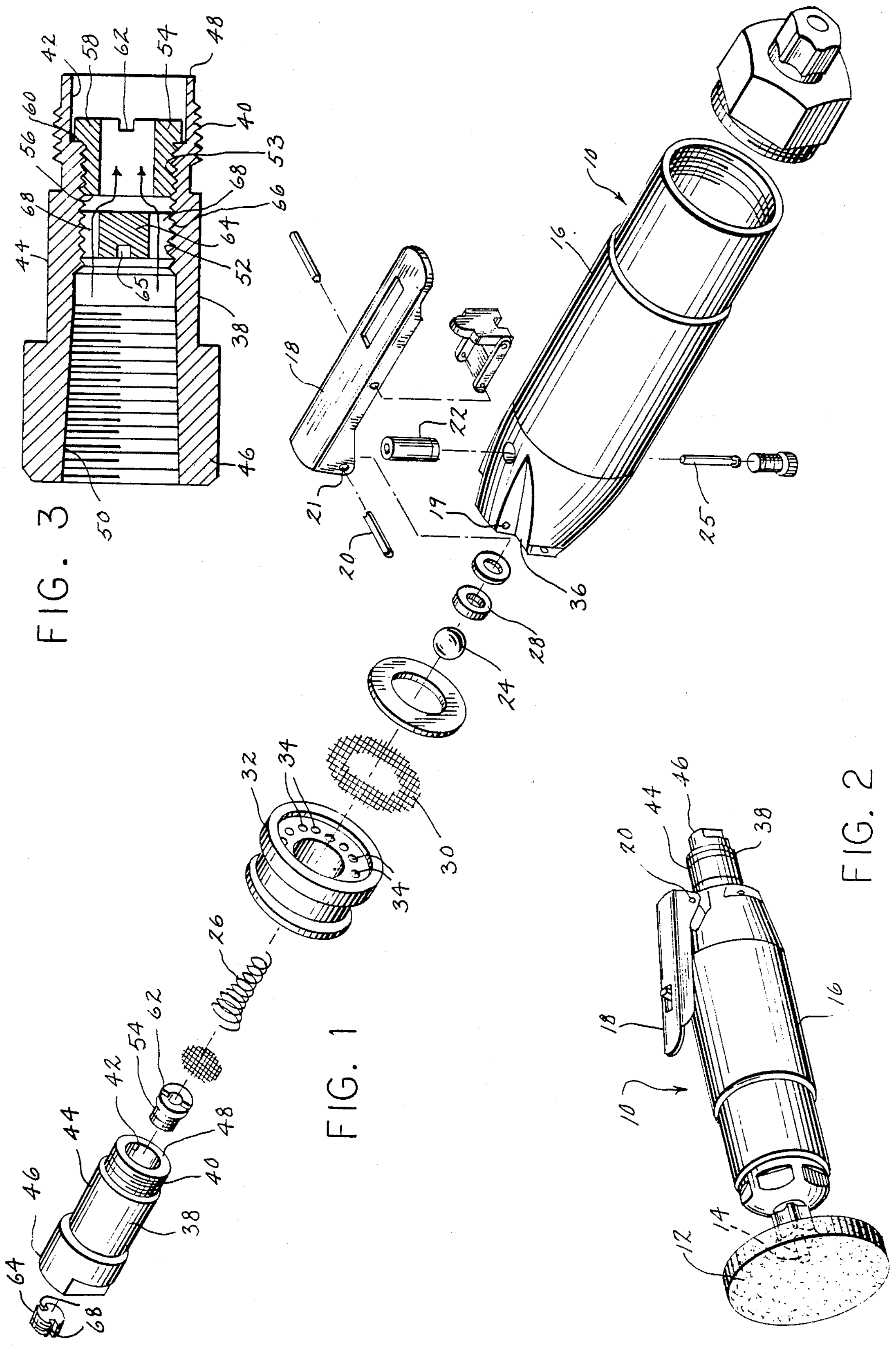
FIG. 1 is an exploded perspective view of an air-powered grinding tool including the speed limiter of the present invention.
FIG. 2 is a perspective view of the assembled air-powered grinder including the speed limiter of the present invention.
FIG. 3 is a side sectional view of the speed limiter of the present invention.

The air-operated grinding tool 10 includes a grinding wheel 12 mounted on a mandrel 14 which is driven by an air-operated motor (not shown) located in a substantially hollow cylindrical housing 16. A control lever 18 turns the tool on and off by controlling air flow to the air-operated motor. The lever 18 is pivotally mounted on the housing 16 by means of the pin 20 which extends through the holes 19 in the housing 16 and through the holes 21 in the lever 18. When the lever 18 is depressed, it presses down on the plunger 22, which, in turn, pushes the ball 24 out of the air flow path, thereby permitting air to flow through into the air-operated motor. The pin 25 keeps the ball 24 in the general area of the seal 28, and, if the handle 18 is released, the spring 26 will push the ball 24 toward the seal 28 until the ball 24 seats on the seal 28, preventing air from flowing through the grinder 10 to the air motor.

The grinding tool 10 shown herein is the Rockwell Grinder Model No. 31GR-500, which is available on the market. The grinder 10 also includes a screen filter 30, and an exhaust member 32, including exhaust ports 34.

The upstream end 36 of the air tool 10 has internal threads (not shown) which are designed to receive the threaded end of an air hose or of an air hose quick connect. A flow passage body 38 of the speed limiter has an externally threaded downstream end 40, which fits through the inside of the exhaust member 32 and is threaded into the internal threads at the upstream end 36 of the grinding tool 10. The main body 38 of the speed limiter is an elongated, hollow member defining an axial air flow path therethrough with an inner surface 42 and has an outer surface 44. The body 38 also has an upstream end 46 and a downstream end 48. The internal surface 42 at the upstream end of the member 38 has tapered internal threads 50 which are identical to the internal threads at the upstream end 36 of the grinding tool 10 and are intended to receive the threaded end of an air supply.

At the end of the threaded portion 50, which is intended to receive the air supply, is another threaded portion 52 of smaller internal diameter. A threaded insert 54 is threaded into a third threaded portion 53 of the main body 38 from the right side to form a ring-shaped or annular, internal land 56 at the right end of the threaded portion 52. The threaded portion 52 continues adjacent to the land 56 in the upstream direction. Alternatively, the land 56 could simply be formed as a part of the body 38 rather than by the threaded insert 54. The threaded insert 54 has large head section 58 which causes the insert 54 to stop when it reaches the shoulder 60 on the inner surface 42 of the speed limiter 38. The insert 54 has a hollow center, and the head portion 58 defines a groove 62 adapted to receive a screwdriver.

An adjusting insert 64 is threaded into the threaded portion 52 of the main body 38 from the left-hand side. The insert 64 has a substantially solid cylindrical shape and defines a threaded outer surface 66 with a pair of opposed, axially-directed grooves or slots 68 along the entire length of its radially outer periphery so that they extend through the insert 64 from the upstream to the downstream end. The grooves 68 are straight-sided and extend radially inwardly further than the land 56 to a radius slightly less than the radius of the internal land 56. The adjusting insert 64 is spaced a distance away from the insert 54, creating a sinuous air flow path as shown by the arrows in FIG. 3. The shorter the distance between the insert 64 and the land 56, the smaller the cross-sectional area of the air flow path and the greater the air restriction. However, air flow will never be completely cut off, because the radius of the lengthwise groove 68 is slightly less than the radius of the land 56, leaving a tiny air flow path even if the insert 64 abuts the land 56.

The speed controller device is adjusted in the factory, with the insert 64 threaded into and out of the threaded portion 52 by means of a screwdriver fitting into the slot (or rotary engagement means) 65 until the proper air flow is achieved. Alternatively, it can be adjusted in the tool to reach a desired speed at a given air pressure. After the factory adjustment is made, a bonding agent is applied to the outside surface of the insert 64 against the inside surface of the threaded region 52 so that, upon curing, the insert 64 is locked in the factory-adjusted position. When the grinding tool 10 is used in the field, an air supply (not shown) is connected to the upstream end 46 of the body 38, so that an operator of the grinding tool would have to disassemble the tool in order to change the factory adjustment. If anyone tampers with the factoryadjusted position of the insert 64, the bonding agent between the end of the insert 64 and the threads 52 of the body 38 will be broken, and this can be detected by a periodic check of the speed adjustment device 38.

While the preferred embodiment has been shown to be used in a specific Rockwell air-powered grinder, a speed limiter of the invention could be used in almost any air powered device. Also, the body 38 can be made to thread into internal threads which are standard in most air tools so that a speed limiter of the invention could be retrofitted to almost any air tool. Therefore, the present invention provides a simple, versatile device which can be easily applied to most air-operated tools presently on the market and can be factory adjusted to provide an air flow limit so that the tool does not operate at greater than specified speeds.

In addition to the modifications mentioned above, it will be obvious to a person skilled in the art that other modifications could be made to the embodiment described herein without departing from the scope of the invention.

What is claimed is:

1. An in-line speed limiter for an air powered tool, comprising:

flow passage means defining an axial air flow path therethrough, said air flow path having an air inlet and an air outlet and internal threads contained between the inlet and the outlet;

means defining an annular land in said air flow path between the inlet and outlet, said annular land being axially adjacent to the internal threads and extending radially inward of the threads; and adjusting means contained between the inlet and outlet and having external threads threadably engaged with the internal threads of the air flow path to be rotatable toward and away from the land, said adjusting means including rotary tool engagement means and at least one slot extending through the adjusting means in the axial direction, said slot radially overlapping the land;

wherein the cross-sectional area of the air flow path through the flow passage means is varied by screwing the adjusting means toward and away from the land to vary the shape and cross-sectional area of the air flow path between the slot and the land to thereby limit the speed of the tool.

2. A speed limiter as in claim 1, wherein two slots extend through the adjusting means in the axial direction, each slot being adjacent to the radially outer periphery of the adjusting means.

3. A speed limiter as in claim 1, wherein the slot extends further radially inward than the land.

4. A speed limiter as in claim 1, wherein the adjusting means is bonded to the flow passage means.

5. A speed limiter as in claim 1, wherein the air flow path defined by the flow passage means communicates inlet air to the tool.

6. A speed limiter as in claim 1, wherein the adjusting means is upstream of the land.

7. A speed limiter as in claim 1, wherein said flow passage means comprises a hollow cylindrical body having a threaded portion at one end for engagement with the airpowered tool and a threaded portion at the other end for connection to an air supply line.

8. A speed limiter as in claim 1, wherein the land defining means comprises a tubular threaded insert screwed into internal threads of the flow passage means opposite from the adjusting means.

* * * * *